United States Patent
Austrheim

(10) Patent No.: US 12,012,280 B2
(45) Date of Patent: Jun. 18, 2024

(54) SUPPORT VEHICLE FOR PERFORMING SUPPORT OPERATIONS IN AN AUTOMATED STORAGE AND RETRIEVAL SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 764 days.

(21) Appl. No.: 17/046,804

(22) PCT Filed: Apr. 12, 2019

(86) PCT No.: PCT/EP2019/059369
§ 371 (c)(1),
(2) Date: Oct. 12, 2020

(87) PCT Pub. No.: WO2019/206672
PCT Pub. Date: Oct. 31, 2019

(65) Prior Publication Data
US 2021/0179351 A1    Jun. 17, 2021

(30) Foreign Application Priority Data

Apr. 26, 2018  (NO) .................................... 20180595

(51) Int. Cl.
*B65G 1/04*     (2006.01)
*B65G 1/06*     (2006.01)
(52) U.S. Cl.
CPC ......... *B65G 1/0464* (2013.01); *B65G 1/0428* (2013.01); *B65G 1/0492* (2013.01); *B65G 1/065* (2013.01)

(58) Field of Classification Search
CPC .. B65G 1/0464; B65G 1/0428; B65G 1/0492; B65G 1/065; B65G 1/0478; B65G 1/0414
See application file for complete search history.

(56) References Cited

U.S. PATENT DOCUMENTS

| 4,470,742 A | 9/1984 | Schindler |
| 9,856,082 B2 * | 1/2018 | Hognaland .......... B65G 1/0407 |

(Continued)

FOREIGN PATENT DOCUMENTS

| CN | 107915008 | 4/2018 |
| DE | 102013018268 | 4/2015 |

(Continued)

*Primary Examiner* — Patrick H Mackey
(74) *Attorney, Agent, or Firm* — Osha Bergman Watanabe & Burton LLP

(57) ABSTRACT

The present invention relates to a support vehicle (20) for performing support operations in an automated storage and retrieval system (1). It comprises a vehicle body (21). It comprises a drive system (40) comprising wheels (42, 44) provided in a lower part of the vehicle body (21), where the drive system (40) being configured to drive the support vehicle (20) along a track system (108) of the automated storage and retrieval system (1). It comprises a connection system (30) provided on a first side (20a) of the support vehicle (20). The connection system (30) comprises a connector member (31) protruding through a aperture (22) of the vehicle body (21). The connection system (30) comprises an actuator (34) for moving the connector member (31) in the aperture (22) in relation to the vehicle body (21). The present invention also relates to an automated storage and retrieval system (1).

16 Claims, 16 Drawing Sheets

(56) References Cited

U.S. PATENT DOCUMENTS

| | | | |
|---|---|---|---|
| 9,952,589 B1 | 4/2018 | Brazeau | |
| 10,836,577 B2 * | 11/2020 | Fryer | B65G 1/0464 |
| 10,882,540 B2 * | 1/2021 | Stadie | B65G 45/18 |
| 2002/0048503 A1 | 4/2002 | Fukushima | |
| 2007/0021863 A1 | 1/2007 | Mountz et al. | |
| 2007/0039513 A1 | 2/2007 | Pinckney et al. | |
| 2012/0259482 A1 | 10/2012 | Jeschke | |
| 2012/0259852 A1 * | 10/2012 | Aasen | G06F 16/24578 |
| | | | 707/E17.014 |
| 2014/0228999 A1 | 8/2014 | D'Andrea et al. | |
| 2018/0370725 A1 * | 12/2018 | Hognaland | B65G 1/0457 |

FOREIGN PATENT DOCUMENTS

| | | |
|---|---|---|
| EP | 0246214 | 11/1987 |
| GB | 2539562 | 12/2016 |
| GB | 2548484 | 9/2017 |
| WO | 2014/059335 | 4/2014 |
| WO | 2014/059335 A1 | 4/2014 |
| WO | 2014/075937 A1 | 5/2014 |
| WO | 2014/090684 A1 | 6/2014 |
| WO | 2015/140216 | 9/2015 |
| WO | 2015/193278 A1 | 12/2015 |
| WO | 2016/120075 A1 | 8/2016 |
| WO | 2015/121512 | 8/2017 |
| WO | 2017/148939 | 9/2017 |
| WO | 2017/148963 | 9/2017 |

* cited by examiner

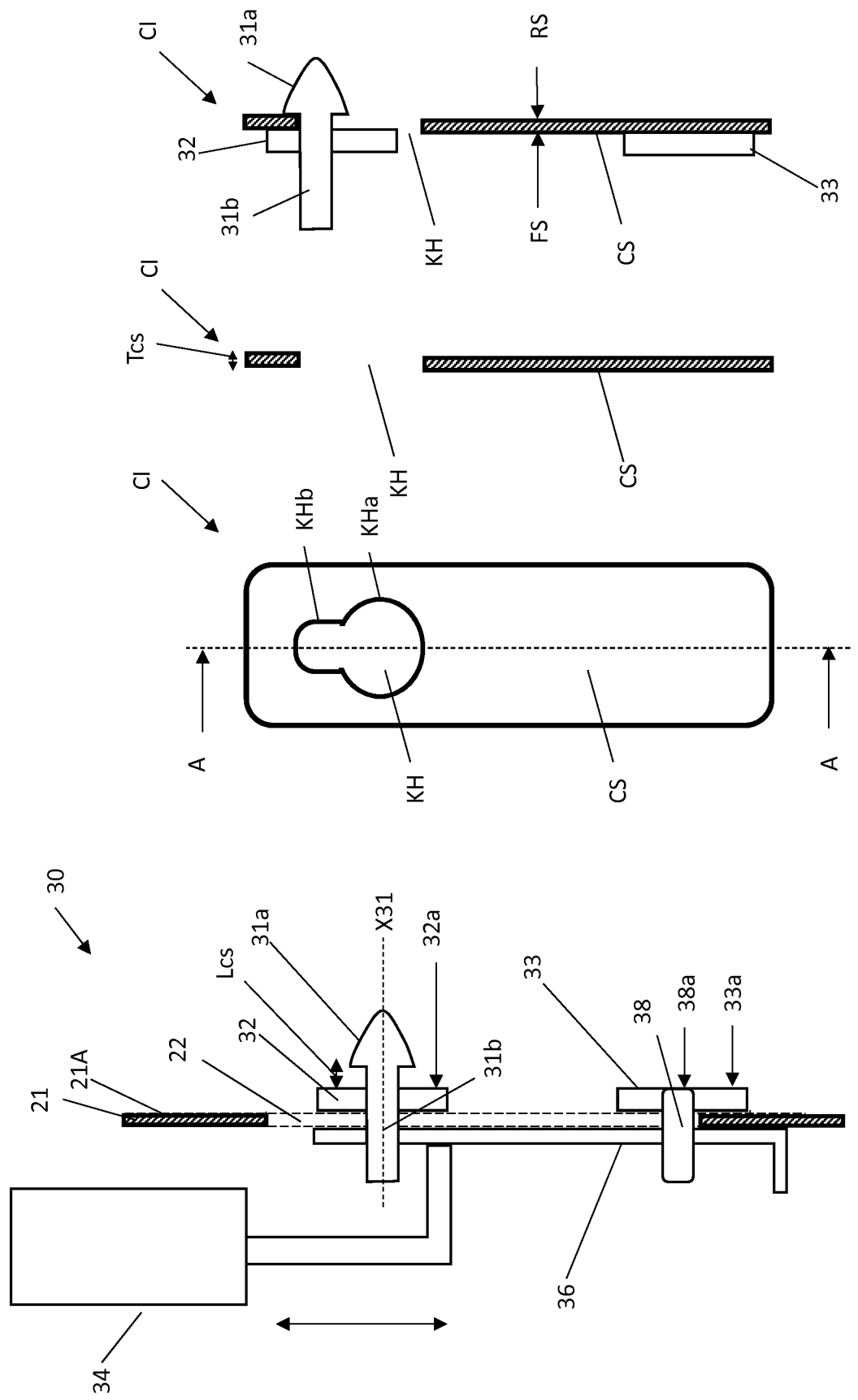

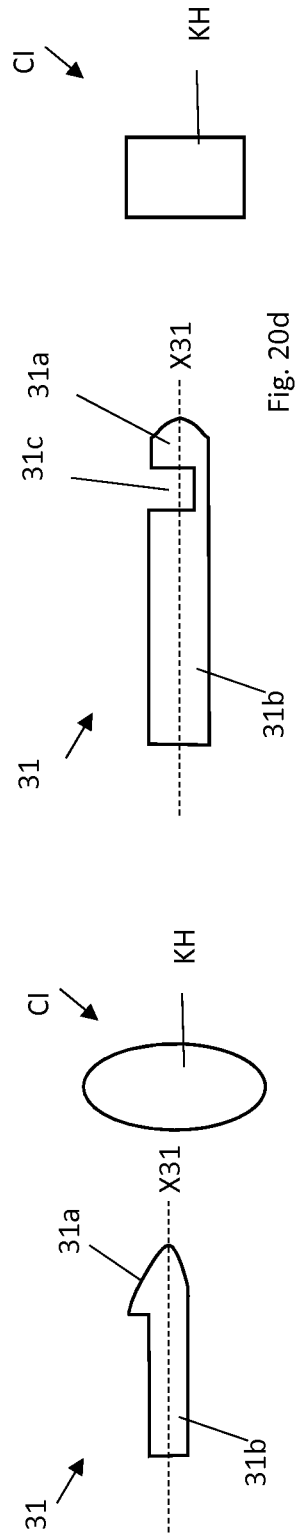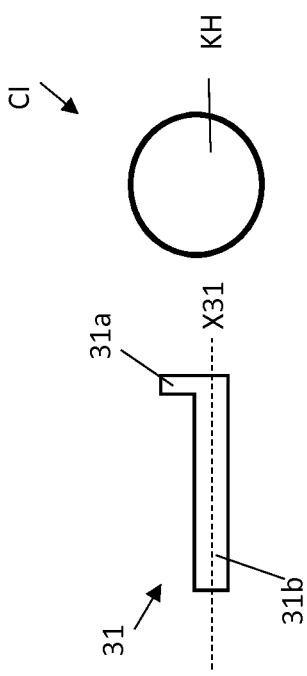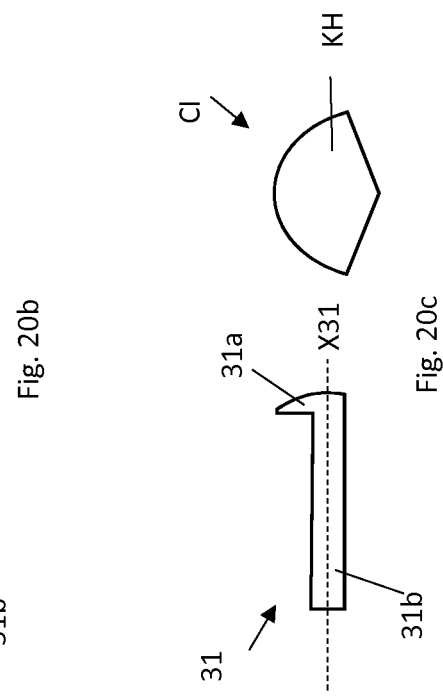

SUPPORT VEHICLE FOR PERFORMING SUPPORT OPERATIONS IN AN AUTOMATED STORAGE AND RETRIEVAL SYSTEM

FIELD OF THE INVENTION

The present invention relates to a support vehicle for performing support operations in an automated storage and retrieval system. The present invention also relates to an automated storage and retrieval system in which such a support vehicle can be used.

BACKGROUND OF THE INVENTION

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, stacked one on top of another to form stacks 107. Each storage container 106 may typically hold a plurality of product items (not shown), and the product items within a storage container 106 may be identical, or may be of different product types depending on the application. The storage grid 104 guards against horizontal movement of the containers in the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage columns 105, on which rail system 108 a plurality of container handling vehicles 201,301 are operated to raise storage containers 106 from and lower storage containers 106 into the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. In this way, the rail system 108 defines grid columns 112 above which the container handling vehicles 201,301 can move laterally above the storage columns 105, i.e. in a plane which is parallel to the horizontal X-Y plane.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. Each set of wheels 201b,301b 201c,301c can be lifted and lowered, so that the first set of wheels 201b,301b and/or the second set of wheels 201c, 301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105.

The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the prior art grid disclosed in FIG. 1, Z=8 identifies the lowermost, bottom layer of the grid 104. Consequently, as an example, and using the Cartesian coordinate system X, Y, Z indicated in FIG. 1, the storage container identified as 106' in FIG. 1 can be said to occupy grid location or cell X=10, Y=2, Z=3, with origo of the coordinate system defined as the upper corner to the right in FIG. 1 (i.e. where the axis X, Y and Z are drawn). The container handling vehicles 201,301 can be said to travel in layer Z=0 and each grid column 112 can be identified by its X and Y coordinates.

Each prior art container handling vehicle 201,301 comprises a storage compartment or space for receiving and stowing a storage container 106 when transporting the storage container 106 across the top of the grid 104. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint which covers an area with dimensions in the X and Y directions, which is generally equal to the lateral area of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201,301 having a footprint generally corresponding to the lateral area defined by a grid column 112 to travel along a row of grid columns even if another container handling vehicle 101 is positioned above a grid column neighboring that row. Both the single and double rail system forms a grid pattern in the horizontal plane P comprising a plurality of rectangular and uniform grid locations or grid cells 122, where each grid cell 122 comprises a grid opening 115 being delimited by a pair of tracks 110a,110b of the first tracks 110 and a pair of tracks 111a,111b of the second set of tracks 111. In FIG. 5 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201,301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119,120.

The grid 104 in FIG. 1 comprises two port columns 119 and 120. The first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119,120 and the access station.

If the ports 119,120 and the access station are located at different levels, the conveyor system may comprise a lift device with a vertical component for transporting the storage containers 106 vertically between the port 119,120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201,301 is instructed to retrieve the target storage container 106 from its position in the grid 104 and transport it to the drop-off port 119. This operation involves moving the container handling vehicle 201,301 to a grid location above the storage column 105 in which the target storage container 106 is positioned, retrieving the storage container 106 from the storage column 105 using the container handling vehicle's 201,301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201,301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

WO2016/120075A1, the contents of which are incorporated herein by reference, shows an example of an automated storage and retrieval system using vehicles with a central cavity. The disclosed container handling vehicles are dimensioned so that they have a footprint, i.e. a contact area against the track system, which has a horizontal area that is equal to the horizontal area of a grid cell. Within the art, such a container handling vehicle, i.e. a container handling vehicle having a footprint with a horizontal area corresponding to the horizontal area of a single grid cell, is sometimes referred to as a "single cell" container handling vehicle. Another single cell container handling vehicle is disclosed in WO2015/193278A1, the contents of which are incorporated herein by reference.

The single cell design disclosed in e.g. WO2016/120075A1 and WO2015/193278A1 reduces the space required for the container handling vehicles to travel on the track system, thus allowing more vehicles to operate on the track system without interfering with each other. Further, the stability of the vehicle operation is increased compared to a cantilever vehicle as disclosed in e.g. NO317366.

WO 2015140216A1 discloses a robotic service device which are used for several such supporting operations. The robotic service device comprises cleaning equipment (brushes, vacuum cleaner) for cleaning the rail system 108 of the grid. The robotic service device further comprises a connection interface for connection to container handling vehicles in order to rescue them, i.e. to push or pull them to a desired location. It is also shown that a relatively large robotic service device may have a member which can be positioned above the container handling vehicle. Then, a winch may be connected to the top of the container handling vehicle and the container handling vehicle can be elevated up from the rails. Another embodiment shows two robotic service devices with a winch provided on a cross beam connected between the two service devices. Here, the container handling vehicle is lifted up towards the beam by means of the winch. The robotic service device can also be connected to a special-purpose person transporter for moving a person to a desired location above the grid 104d for maintenance, service, repair etc.

One object of the invention is to provide a flexible support vehicle for such storage systems, i.e. the object is that the same support vehicle should be used for several types of support operations. One example of such a support operation is to move a further vehicle, such as a container handling vehicle, to a predefined location, typically a service area, where the further vehicle can be repaired, maintained or transported further away from the grid. Another example of such a support operation is to clean the grid. Another example of such a support operation is to move a person, equipment (for example tools, spare parts etc.) or other objects from a first location to a second location.

Another object of the invention is that the support vehicle should support several types of container handling vehicles.

Another object of the invention is that the costs (material handling cost, labor cost) should be low. To achieve this, it is an object that as many parts as possible should be in common with parts of a container handling vehicle. In this way, much of the same production line may be used when manufacturing the support vehicle as when producing the container handling vehicle. In this way, spare parts can be used both for the support vehicle and the container handling vehicle.

Another object is to provide the support vehicle with a small footprint on the grid, it should be equal to, or not much larger than the container handling vehicles.

SUMMARY OF THE INVENTION

The present invention relates to a support vehicle for performing support operations in an automated storage and retrieval system, where the support vehicle comprises:
 a vehicle body;
 a drive system comprising wheels provided in a lower part of the vehicle body, the drive system being configured to drive the support vehicle along a track system of the automated storage and retrieval system;
 a connection system provided on a first side of the support vehicle;
 characterized in that
 the connection system comprises a connector member protruding through a aperture of the vehicle body;
 the connection system comprises an actuator for moving the connector member in the aperture in relation to the vehicle body.

The connector member may have a circular, a triangular, a rectangular or polygonal cross section, or any other shape. The connector member may be provided from the inside of the vehicle body through the aperture and to the outside of the vehicle body. Preferably, the connector member is a connector pin.

In one aspect, the connection system is connectable to and disconnectable from a connection interface.

In one aspect, the connection interface comprises a keyhole, where the connector member is connectable to and disconnectable from the keyhole. The keyhole may have the shape of door-type of keyhole turned upside-down, i.e. with the larger part of the opening provided lower than the smaller part of the opening.

The term "keyhole" is here defined as any type of opening into which the connector member can be inserted into and retrieved from. Preferably, the term "keyhole" is an opening into which the connector member can be inserted into, locked to, unlocked from, and then retrieved from. Preferably, these operations are performed by moving the connector member in relation to the connection interface.

The keyhole may be an opening provided in a structure. This structure may be an additional unit connectable to and disconnectable from the support vehicle. The structure may also be a container handling vehicle. Preferably, the structure is a plate-shaped structure such as the wall or body of the additional unit or container handling vehicle. The keyhole is typically provided in an vertical part of the structure. The opening can be circular, semi-circular, keyhole-shaped, triangular, rectangular, polygonal etc. Preferably, the keyhole and the connector member is adapted to each other, in order to ensure that they can be connected to and connected from each other.

The support vehicle and the additional unit with its connection interface can be defined as a support system. Alternatively, the additional unit with its connection interface may be defined to be a part of the support vehicle itself, i.e. the support vehicle comprises the connection interface and the support vehicle comprises the additional unit with its connection interface.

In one aspect, the aperture is an elongated aperture referred to as a slot. The aperture may here be elongated in a vertical direction or in an inclining direction in the plane of the vertical outside wall or body of the additional unit or container handling vehicle. Alternatively, the aperture can be elongated in a horizontal direction.

The aperture can be elongated and the actuator can be a linear actuator for moving the connector member linearly in the elongated aperture. Alternatively, the aperture is an opening for the connector member, and the actuator is a pivoting actuator for pivoting the connector member in relation to the aperture.

In one aspect, the connector member is a first connector member and where the connection system further comprises a second connector member, where the first connector member is provided through the first aperture and where the further or second connector member is provided through the second aperture. The two apertures, and hence the two members, are spaced apart from each other.

In one aspect, the connector members are connected to each other via a rigid cross member provided on the inside of the vehicle body.

In this way, the two connector members can be moved in parallel to each other. This is a preferred solution when the apertures are vertical or substantially vertical. The actuator can be connected to the rigid cross member. Hence, one actuator can be used to move both connector members. Alternatively, there can be several actuators connected to the cross member or directly to each connector member. However, when the aperture is horizontal, then the two connector members can be configured to move towards each other or away from each other. Such a solution may require one actuator for each connector member. The actuator is preferably fixed to the inside of the vehicle body.

In one aspect, the connector member comprises a head provided in the end of the member being distal from the vehicle body.

In one aspect, the head is provided for contact with a rear side of the connection interface.

In one aspect, the head is protruding from the member in a direction perpendicular to a longitudinal axis of the connector member.

The head may be provided as an enlarged section of the connector member itself, i.e. for example like a commonly known threaded bolt or screw with a bolt or screw head. Alternatively, the head may be formed by providing a notch in the connector member itself, thereby separating the connector member into two separate sections, a distal section forming the head and a proximal section.

The head is configured to be inserted into the keyhole of the connection interface and is configured to be provided in contact with the rear side of the connection interface. This is referred to as a connected or locked state, in which the support vehicle may move the connection interface forward, rearward and sideways. It should be noted that the embodiment of the connection system having a connector member without a head will be able to move the connection interface forward (by pushing) and sideways (by dragging the connection interface along the support vehicle). However, rearward movement will be difficult, as the connector member will be pulled out of the keyhole of the connection interface.

In one aspect, the connection system comprises a first contact body connected to the connector member or to the vehicle body at a horizontal distance from the head, where a surface of the first contact body is provided for contact with a front surface of the connection interface.

In one aspect, the connection system comprises a second contact body provided at a vertical distance from the first contact body, where a surface of the second contact body is provided for contact with the front surface of the connection interface.

The first and second contact bodies may allow the connection interface to be provided substantially in parallel with the vehicle body. Preferably, both the front surface of the vehicle body into which the apertures are provided, and the connection interface, are oriented vertically.

Preferably, the connection system provides a rigid connection between the support vehicle and the connection interface. Hence, when the connection system is connected the connection interface, relative movement between the support vehicle and the connection interface is prevented by the engagement between the connector member and keyhole, and also by the engagement between the contact surfaces of the contact bodies and the front surface of the connection interface.

In one aspect, the support vehicle comprises an additional support unit, where the connection interface is fixed to the additional support unit.

In one aspect, the additional support unit comprises a further connection system for connection to a container handling vehicle, where the further connection system comprises:
- a wheel actuator for connection to a mechanical interface of the container handling vehicle for adjusting wheel elevation of the container handling vehicle;
- a push body for contact with the container handling vehicle when pushed by the support vehicle.

In one aspect, the further connection system of the additional supporting unit comprises a pull body for contact with the container handling vehicle when pulled by the support vehicle.

The present invention also relates to an automated storage and retrieval system comprising:
- a track system comprising a first set of parallel tracks arranged in a horizontal plane and extending in a first direction and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
- a plurality of stacks of storage containers arranged in storage columns located beneath the track system, wherein each storage column is located vertically below a grid opening;
- a container handling vehicle for lifting storage containers stacked in the stacks; characterized in that the system comprises a support vehicle and at least one additional support unit for performing support operations in an automated storage and retrieval system, where the support vehicle comprises a connection system connectable to and disconnectable from a connection interface of the additional support unit.

The additional support units are special-purpose support units for performing specific support operations.

The present invention also relates to an automated storage and retrieval system, where the support vehicle is a support vehicle as defined above.

The present invention also relates to an automated storage and retrieval system, where the additional support unit is one of the following:
- an intermediate supporting unit for connecting the support vehicle to a container handling vehicle, where the support vehicle is configured to pull, push or drag the container handling vehicle along the track system to a service area of the system;
- a person transporting unit for transporting a person along the track system from the service area to a desired location in the system;
- a equipment transporting unit for transporting equipment along the track system from the service area to a desired location in the system;
- a cleaning unit for cleaning the track system; or
- a counterweight unit for balancing the support vehicle.

DETAILED DESCRIPTION

Embodiments of the invention will now be described by way of example only and with reference to the enclosed drawings, where:

FIG. 19a illustrates a cross sectional view of an exemplary connection system;

FIG. 19b illustrates a front view of the connection interface of FIG. 19a;

FIG. 19c illustrates a cross sectional view along line A-A in FIG. 19b;

FIG. 19d illustrates a cross sectional view of some parts of the connection system being in contact with the connection interface;

FIG. 20a-d illustrate alternative embodiments of the connection system;

Initially, it should be mentioned that prior art features of an automated storage and retrieval system 1 are described in the introduction above, including references to documents which are incorporated herein by reference.

It is now referred to FIG. 6-13. Here, it is shown a support vehicle 20 for performing support operations in the automated storage and retrieval system 1.

Figure 6:
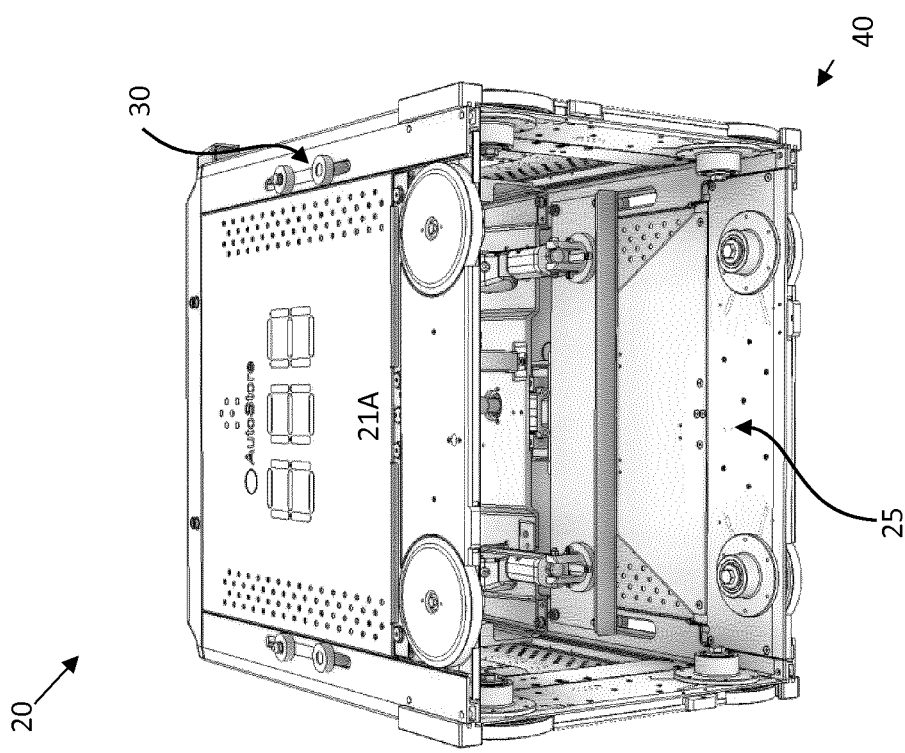
FIG. 6 illustrates a perspective view from below of an exemplary support vehicle.
Figure 8:
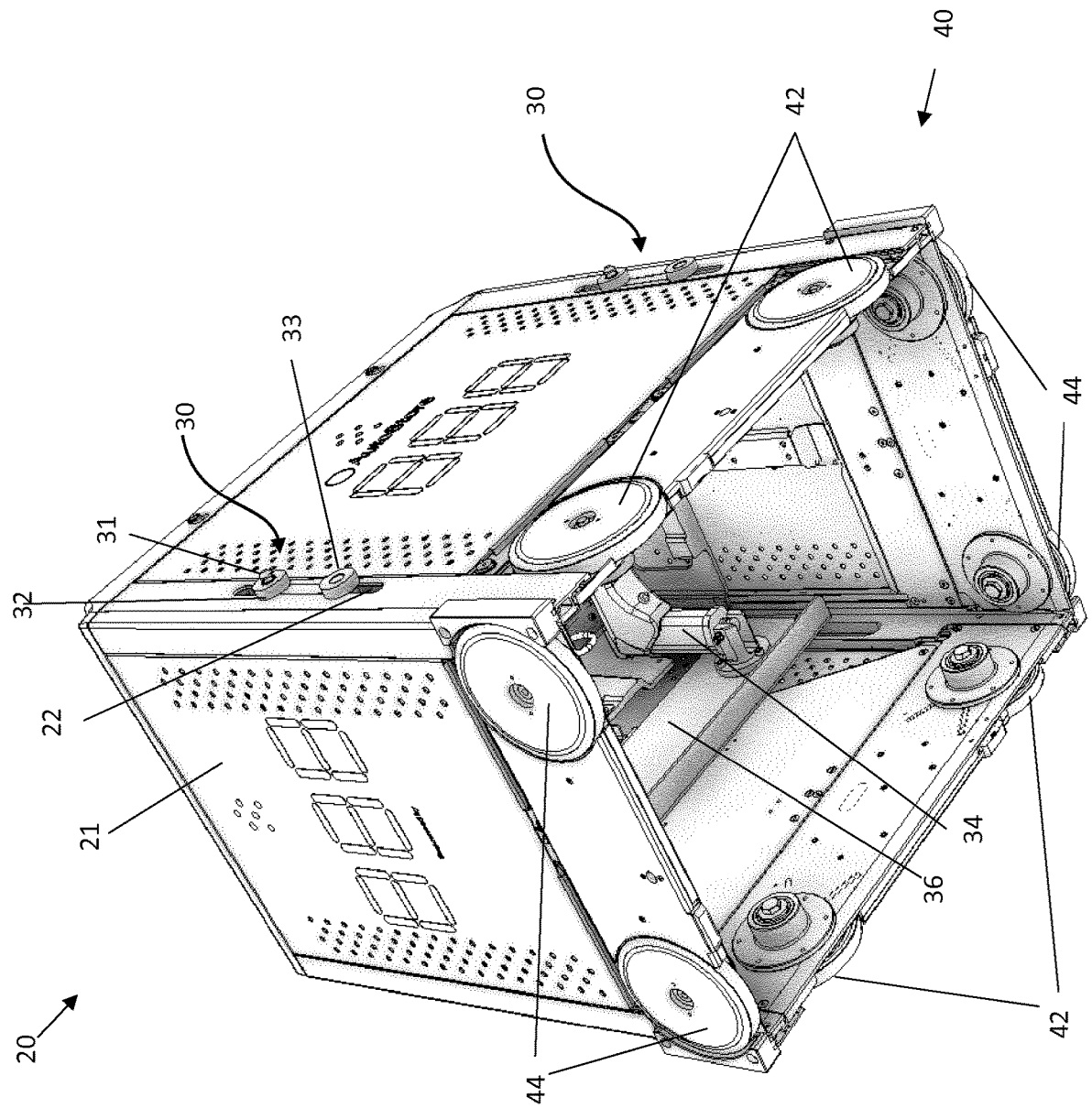
FIG. 8 illustrates another perspective view from below of the support vehicle shown in FIG. 6.

The support vehicle 20 comprises a vehicle body 21 with a central cavity 25 (FIG. 6). A drive system 40 is provided in the lower part of the support vehicle 20. The drive system 40 is configured to drive the support vehicle 20 along the track system 108 of the automated storage and retrieval system 1. The drive system 40 comprises a motor, typically an electric motor, and a power source, typically a rechargeable battery. The drive system 40 further comprises a first set of wheels 42 and a second set of wheels 44, where the support vehicle 20 is moving in a first direction (for example X-direction) when the first set of wheels 42 are in contact with the track system 108 and where the support vehicle 20 is moving in a second direction (for example the Y-direction) when the second set of wheels 44 are in contact with the track system 108. The drive system 40 also comprises an actuator for bringing the desired set of wheels in contact with the track system. The drive system 40 further comprises a control system for controlling the movement of the support vehicle 20 within the system 1. It should be noted that the drive system 40 of the support vehicle 20 is considered to be known for a person skilled in the art.

The support vehicle 20 further comprises a connection system 30 provided on a first side 21A of the vehicle body 21. The connection system 30 is connectable to and disconnectable from a connection interface CI, for example a connection interface CI of an additional support unit. The connection system 30 will be described further in detail below.

First, it should be noted that the embodiment of the support vehicle 20 shown in the drawings comprises one connection system 30 provided on a first side 21A of the vehicle body 21 and an additional connection system 30 provided on a second side 21B, opposite of the first side 21A. It should be noted that for many of the applications described herein, one such connection system 30 is sufficient. It should however also be noted that it is possible to provide the support vehicle 20 with a corresponding connection system 30 on a third side and/or fourth side.

Now, the connection system 30 will be described in detail with reference to FIG. 9, 10 and FIGS. 19a-19d.

In FIG. 19a, it is shown that the exemplary connection system 30 comprises a connector member or pin 31 protruding through an aperture or slot 22 of the vehicle body 21. In the present embodiment, the connector pin 31 has two sections, a first section having a head or pin head 31a and a second elongated section or shank 31b defined with a longitudinal axis X31. The shank 31b is cylindrical in the present embodiment.

In the present embodiment, the slot 22 is a vertical slot 22, in which the connector pin 21 can be moved vertically by means of an actuator 34. The actuator 34 is an electric linear actuator 34.

On the outside of the vehicle body 21, a first contact body 32 is provided. The first contact body 32 can be connected to the connector pin 31 or to the vehicle body 21 at a horizontal distance from the pin head 31a. In the present embodiment, the first contact body 32 is connected to and around the connector pin 31.

In addition to the first contact body 32, the connection system 30 comprises a second contact body 33 provided at a vertical distance from the first contact body 32.

A rigid member 36 is provided on the inside of the vehicle body 21. The rigid member 36 is used to connect the actuator 34 to the connector pin 31 and also to the first contact body 32. Moreover, the second contact body 33 is connected to the rigid member 36 by means of a connector 38. Hence, when the actuator 34 is moving vertically, also the rigid member 36, the connector pin 31 and the first and second contact bodies 32, 33 are moving vertically.

In FIG. 19a, the connection system 30 is in its lower or unlocked position.

It is now referred to FIGS. 19b and 19c, in which the connection interface CI is shown to comprise a plate-shaped connection structure CS with a keyhole KH. In the present embodiment, the keyhole KH comprises a circular opening Kha into which the pin head 31a can be easily inserted and a narrower slot KHb above the circular opening KHa into which the shank 31b can be moved, but from which the pin head 31a cannot easily be retrieved. Hence, when the connection system 30 is in the lower or unlocked position (and the connection interface CI is stationary), the connector pin 31 may be moved into and out from the keyhole KH.

It is now referred to FIG. 19d. Here it is shown that the connector pin 31 has been moved into the keyhole KH and then moved upwardly by means of the actuator 34. This position is referred to as an upper or locked position. In this locked position, if the support vehicle is moved to the left in FIG. 19*d*, the connection structure CS will be pulled together with the support vehicle 20 as the pin head 31 is engaged with the rear side RS of the connection structure CS. By moving the connector pin downwardly to the unlocked position by means of the actuator, the connection system 30 will be free to move out of engagement with the connection interface CI.

It should be noted that in FIG. 19*d*, contact surfaces 32*a*, 33*a* of the first and second contact bodies 32, 33 are in contact with a front side FS of the connection structure CS. Hence, the first and second contact bodies 32, 33 provide that the connection interface CI is oriented as desired with respect to the vehicle body 21. Preferably, the connection interface CI is oriented parallel with the side 21A of the vehicle body 21. Preferably, both the first side 21A of the vehicle body 21 and the connection interface CI are oriented vertically as shown in FIG. 19*a-d*.

In FIG. 19*d* it is also shown that the longitudinal distance Lcs between the contact surface 32*a* of the contact body 32 and the pin head 31*a* is equal to or a little longer than the thickness Tcs of the connection structure CS.

Figure 10:
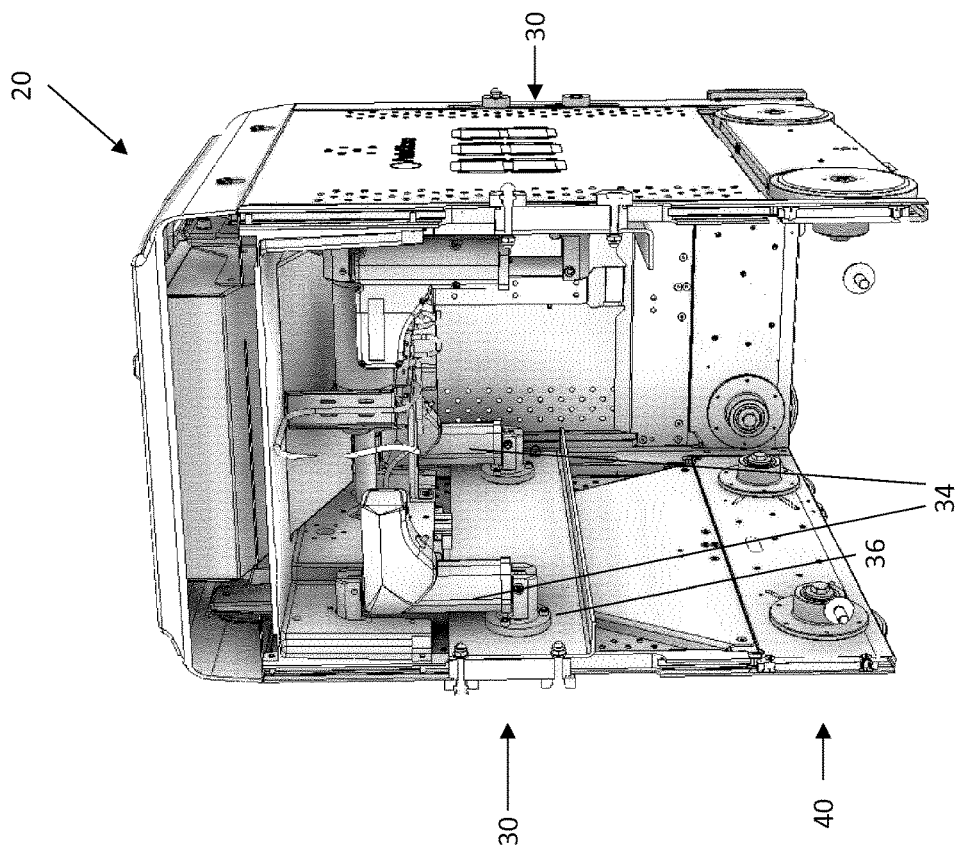
FIG. 10 illustrates the inside of the support vehicle of FIG. 6 with the actuators on one side in the upper position.
Figure 9:
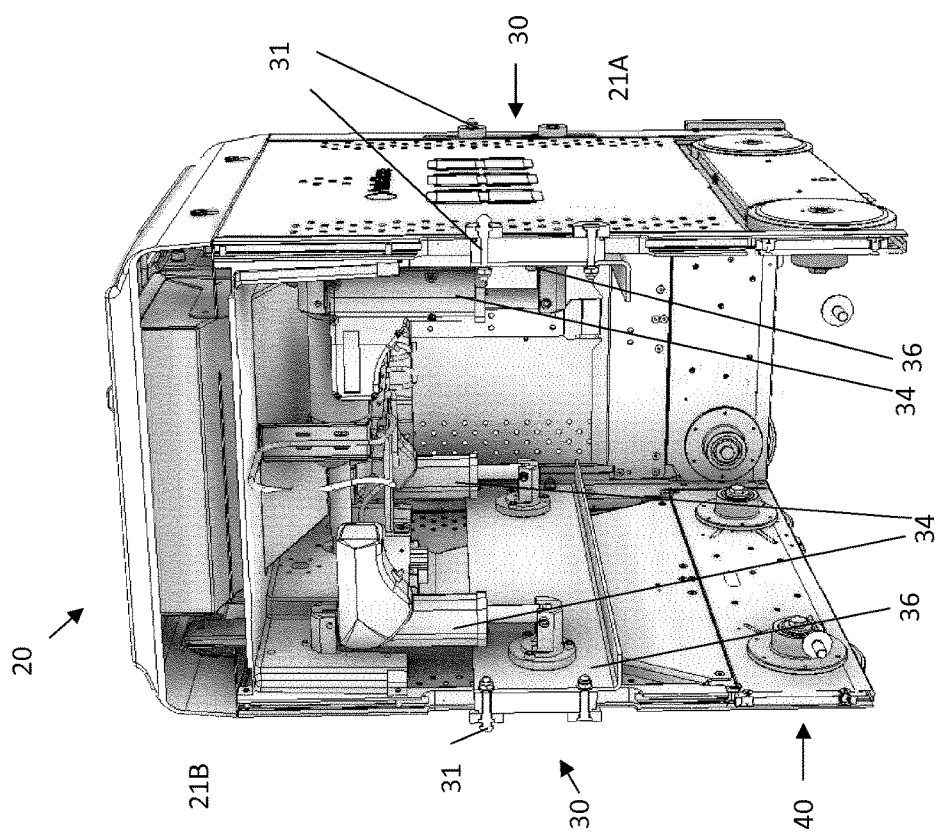
FIG. 9 illustrates the inside of the support vehicle of FIG. 6 with the actuators in the lower position.

It is now referred to FIGS. 9 and 10. Here it is shown that the connection system 30 comprises two connector pins 31 on the first side 21*a* of the vehicle body 21. The two connector pins 31 are provided in two slots 22 in the vehicle body 21, where the two slots 22 are spaced apart from each other.

The further connection system 30 on the second side 21*b* of the vehicle body 21 also comprises two such connector pins 31 provided in two spaced apart slots 22.

The rigid member 36 described above with reference to FIG. 19*a* is here used as a rigid cross member 36 which is connecting the connector pins 31 to each other. In this way, the two connector pins 31 are moved vertically in parallel. It should be noted that two actuators 34 are connected between the inside of the vehicle body 21 and each cross member 36.

Figure 1:
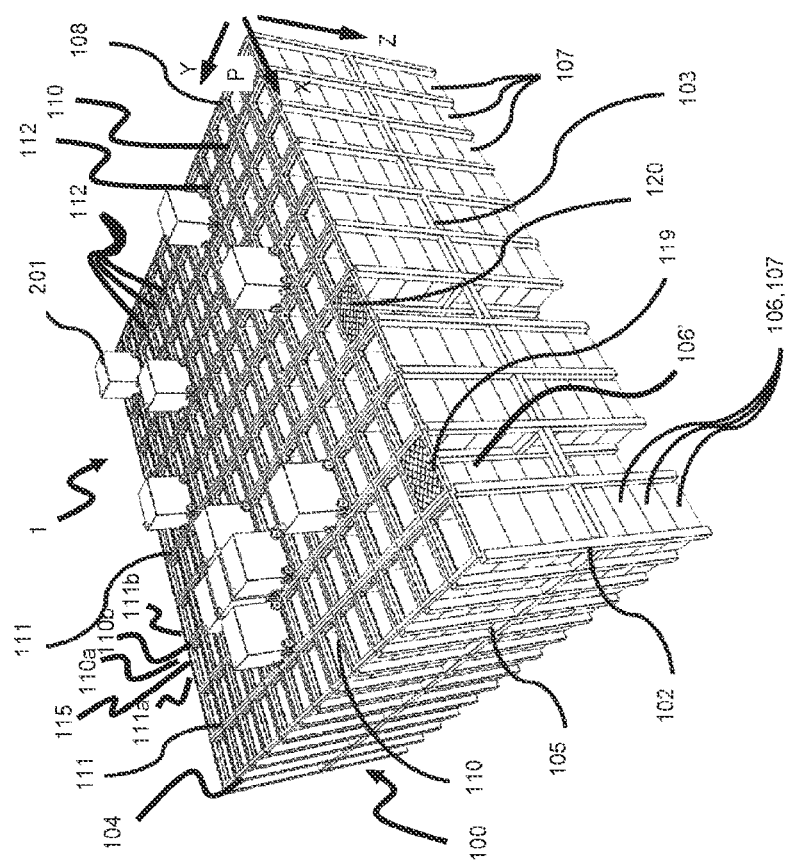
FIG. 1 is a perspective view of a grid of a prior art automated storage and retrieval system.
Figure 2:
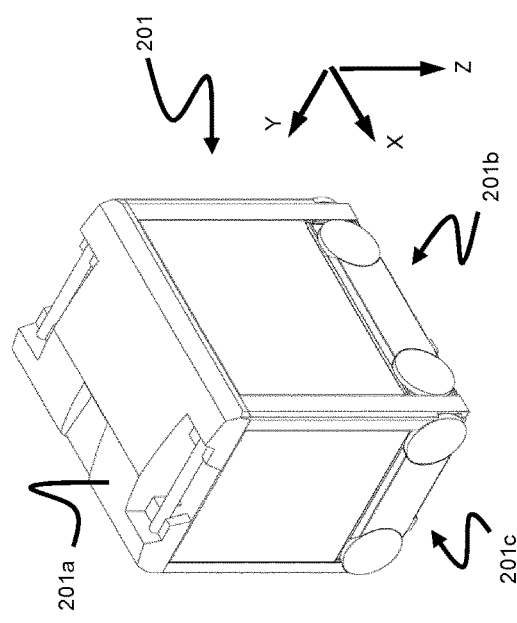
FIG. 2 is a perspective view of a prior art container handling vehicle having a centrally arranged cavity for containing storage containers therein.
Figure 3:
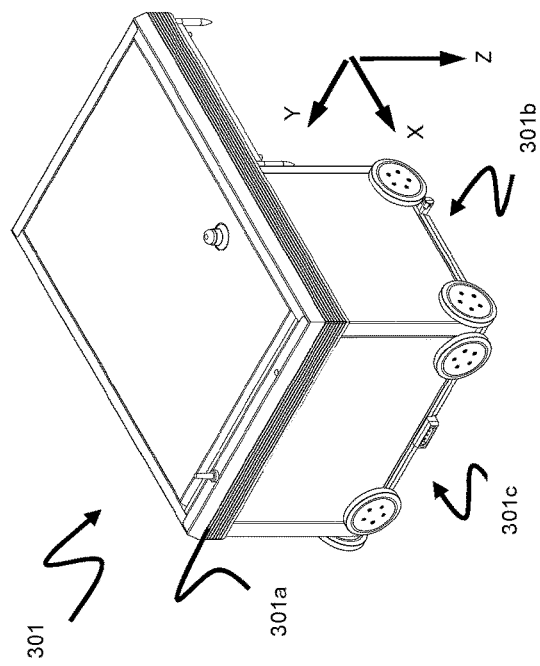
FIG. 3 is a perspective view of a prior art container handling vehicle having a cantilever for containing storage containers underneath.
Figure 4:
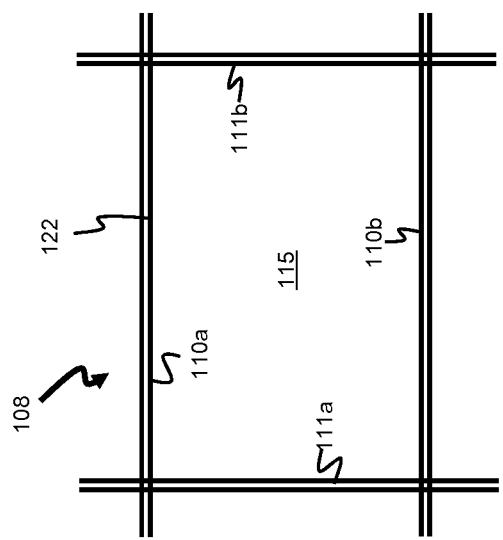
FIG. 4 is a top view of a prior art single rail grid.
Figure 5:
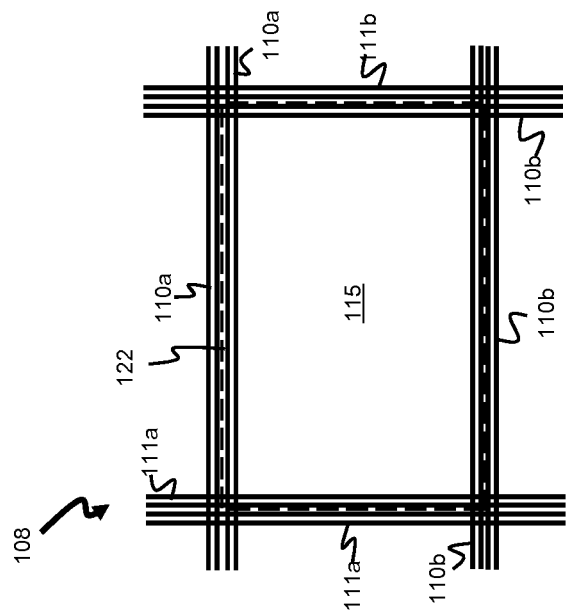
FIG. 5 is a top view of a prior art double rail grid.
Figure 7:
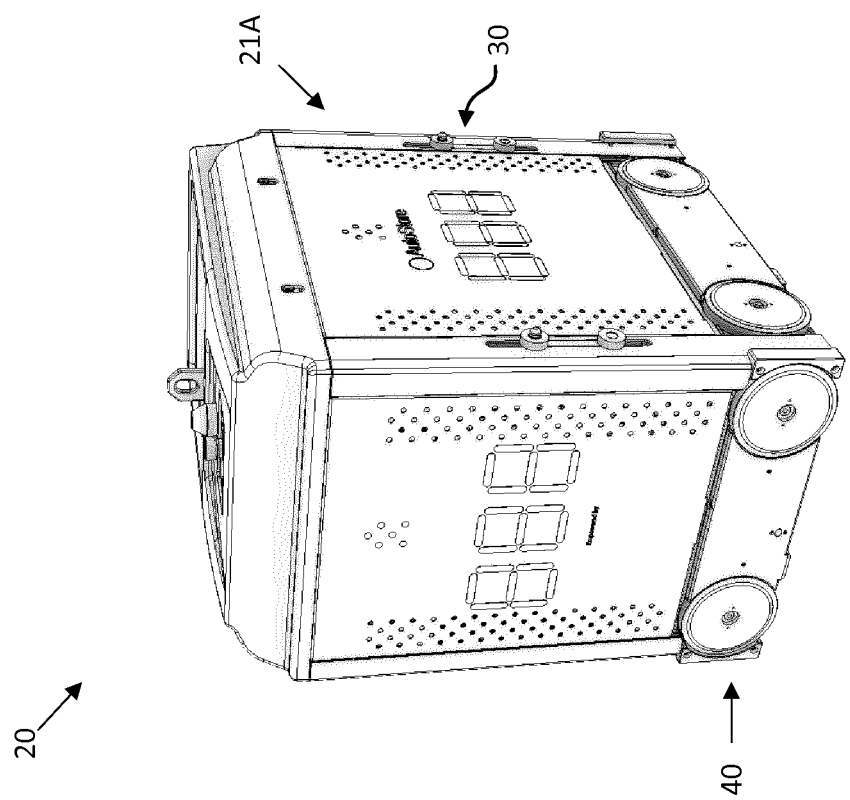
FIG. 7 illustrates a perspective side view of the support vehicle in FIG. 6.
Figure 17A:
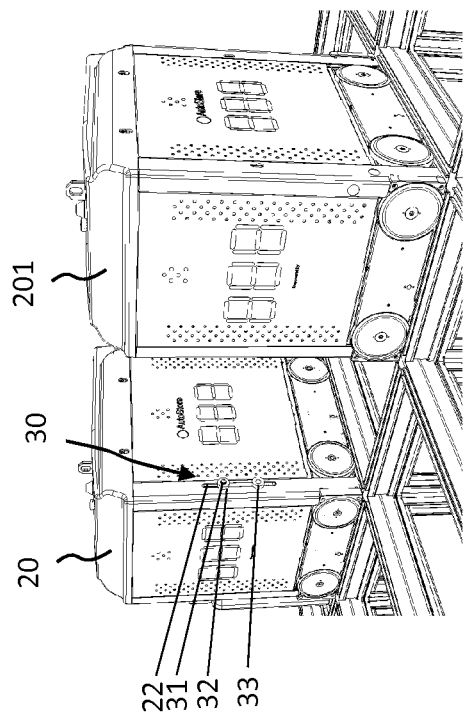
FIG. 17a illustrates a perspective side view of an exemplary support vehicle connected to a weight unit and adjacent to a second type of container handling vehicle.

The support vehicle 20 is based on the type of prior art container handling vehicle 201 shown in FIG. 2, i.e. a container handling vehicle 201 with a cavity arranged centrally within the vehicle body 201*a*. In FIG. 17*a*, another example of such a container handling vehicle 201 is shown. In FIG. 17, the appearance of the support vehicle 20 is even more similar to the appearance of the container handling vehicle 201.

Only minor modifications are needed to manufacture a support vehicle 20 from such a container handling vehicle 201. One modification is that slots must be provided in the vehicle body 21 and that the different parts of the connection system 30 must be mounted to the vehicle. Preferably, the container lifting device of the prior art container handling vehicle 201 is removed to save costs and also to provide sufficient space for the actuators 34. In some applications, it may be required to modify the drive system, as the support vehicle 20 may be designed to handle a larger total weight than a typical container handling vehicle. Hence, a more powerful motor of the drive system 40 may be needed, possibly also more robust bearings for the wheels may be used etc. All in all, the number of modifications are still relatively low. In addition, relatively small modifications in the control system are needed, for controlling the actuators 34.

The automated storage and retrieval system 1 may comprise one or more support vehicles 20 and at least one additional support unit. The additional supporting unit comprises a connection interface CI to which the support vehicle 20 can connect to and disconnect from. Together, the support vehicle 20 and the additional supporting units form a support system for an automated storage and retrieval system 1.

In general, the connection system 30 may be configured to be connected to the connection interface CI of the additional support unit by the following operation:

moving the connector pin 31 to a first (here: lower) position aligned with the keyhole KH of the connection interface CI of the unit;

moving the connector pin 31 horizontally into the keyhole KH by moving the support vehicle 20 along the track system towards the unit;

moving the connector pin 31 to a second (here: upper) position different from the first position.

In this second position, movement of the support vehicle 20 away from the unit will cause the unit to be pulled by the support vehicle. Movement of the support vehicle 20 towards the unit will cause the unit to be pushed by the support vehicle. In the two directions mentioned here, the support vehicle 20 and the unit will move along tracks 110 of FIG. 11.

Movement of the support vehicle in a direction perpendicular to the push/pull direction will cause the unit to be dragged or pushed in parallel with the support vehicle 20. This last movement will, as described in the introduction above, require that the correct set of wheels become in contact with tracks 111, or tracks parallel with tracks 111, in FIG. 11.

In general, the connection system 30 is configured to be connected from the connection interface CI by the following operation:

lowering the connector pin 31 to its first (here: lower) position again;

moving the connector pin 31 horizontally out of the keyhole KH by moving the support vehicle 20 along the rails track system 108 away from the unit.

Figure 18:
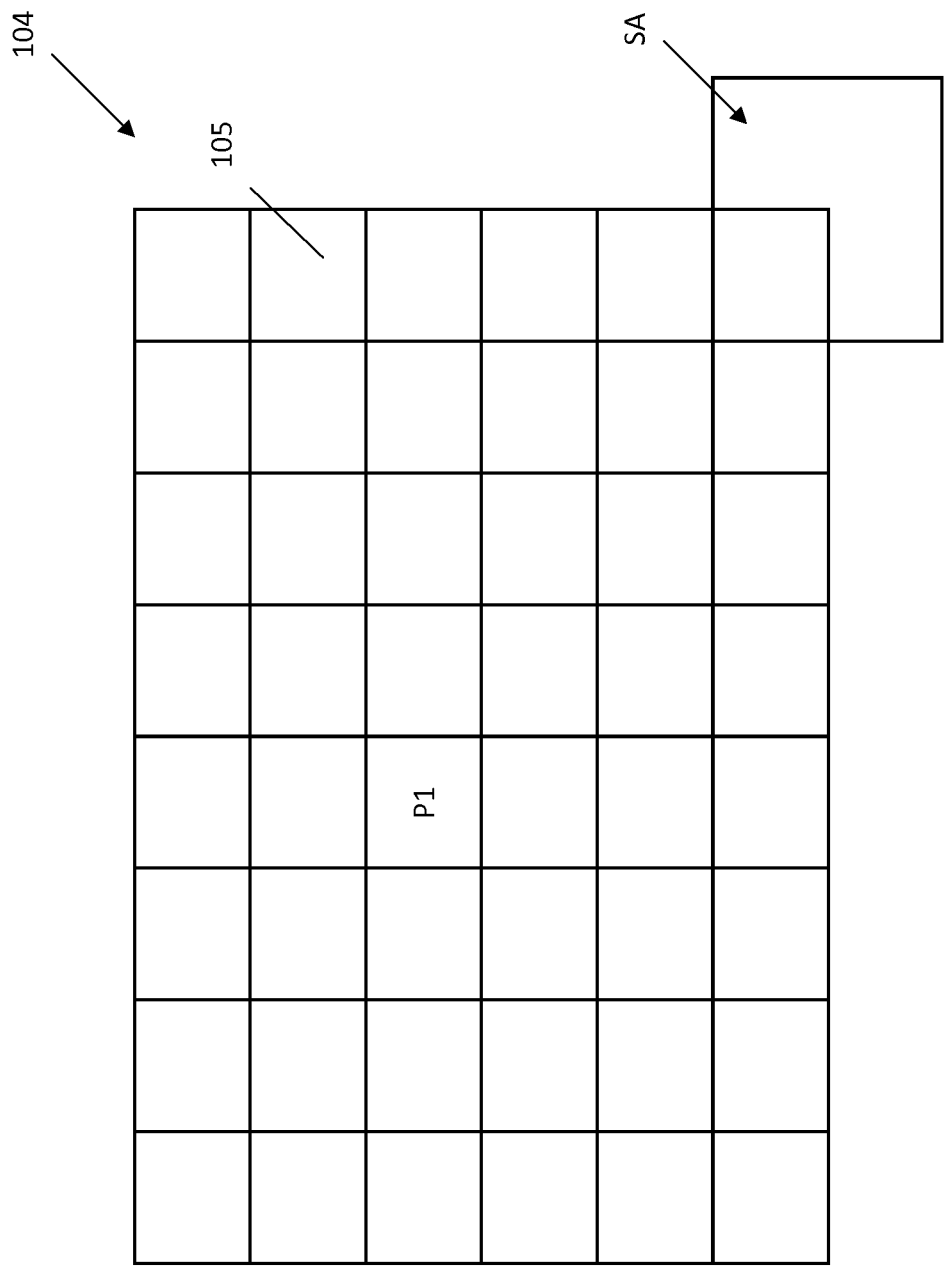
FIG. 18 illustrates a simplified grid from above, where a service area is indicated in one corner of the grid.

It is now referred to FIG. 18. Here the storage grid 104 is seen from above, with storage columns 105 and a service area SA adjacent to the storage columns 105. The service area SA is an area where service, maintenance and repair operations are performed on the vehicles in the system 1. The track system 108 is at least partially continues into the service area SA. Hence, vehicles can be driven into the storage grid from the service area and out from the storage grid and into the service area.

Examples of different support units will be described through the following examples:

Example 1

Figure 11:
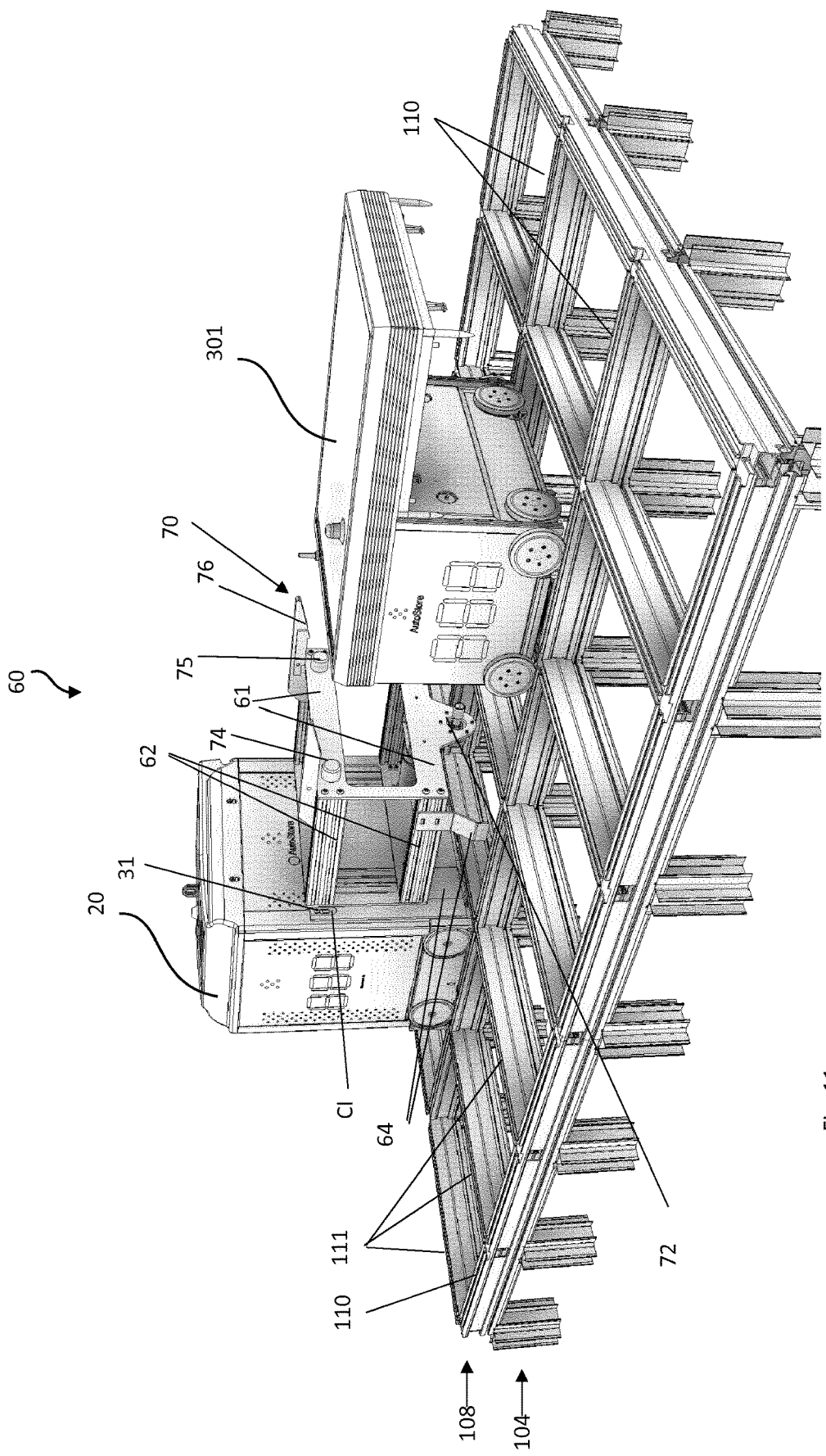
FIG. 11 illustrates a perspective view of an exemplary support vehicle using an adaptor to connect to a first type of container handling vehicle.
Figure 12:
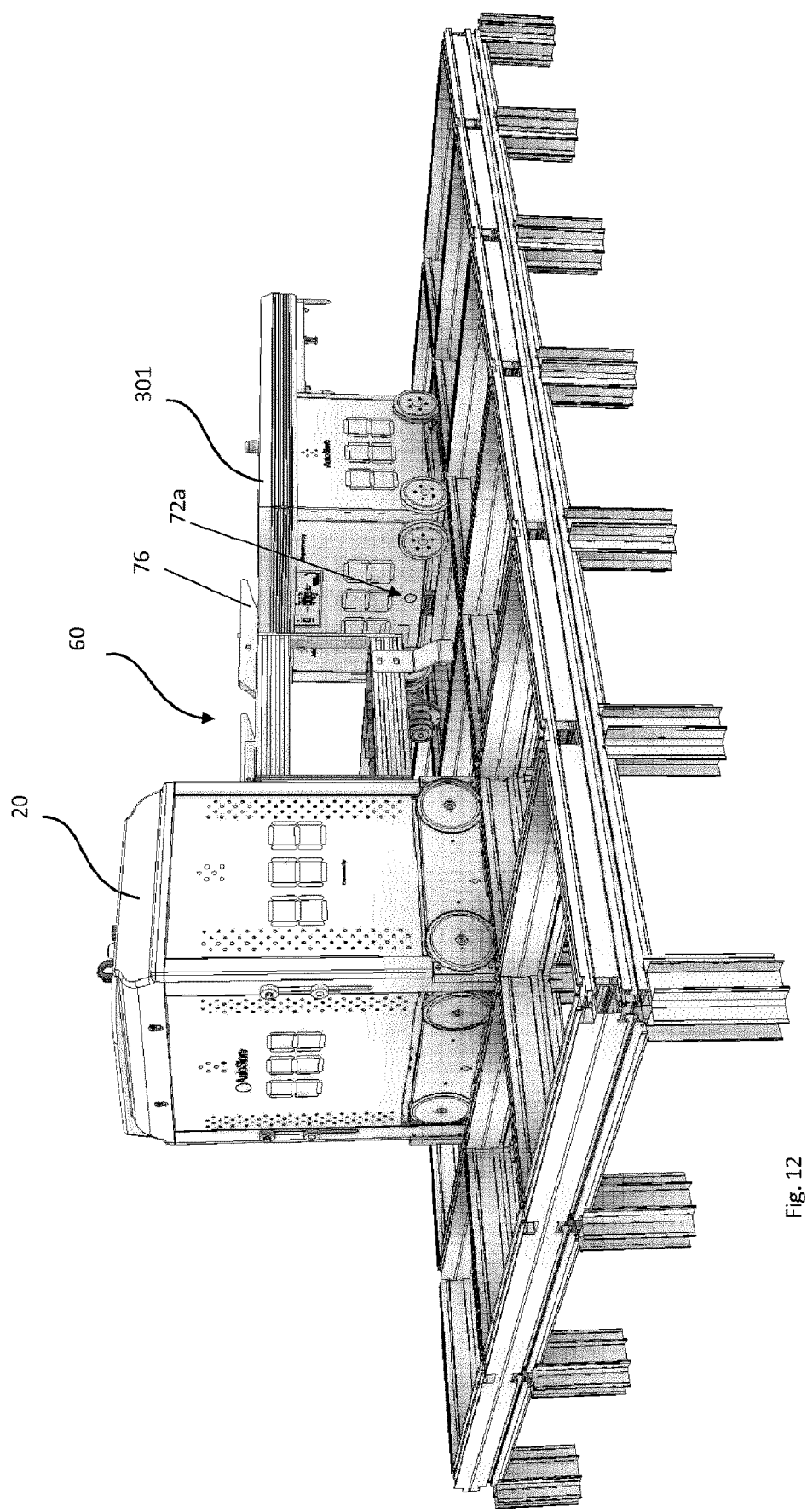
FIG. 12 illustrates a perspective view of the connection interface of the first type of container handling vehicle before being connected to the adapter.
Figure 13:
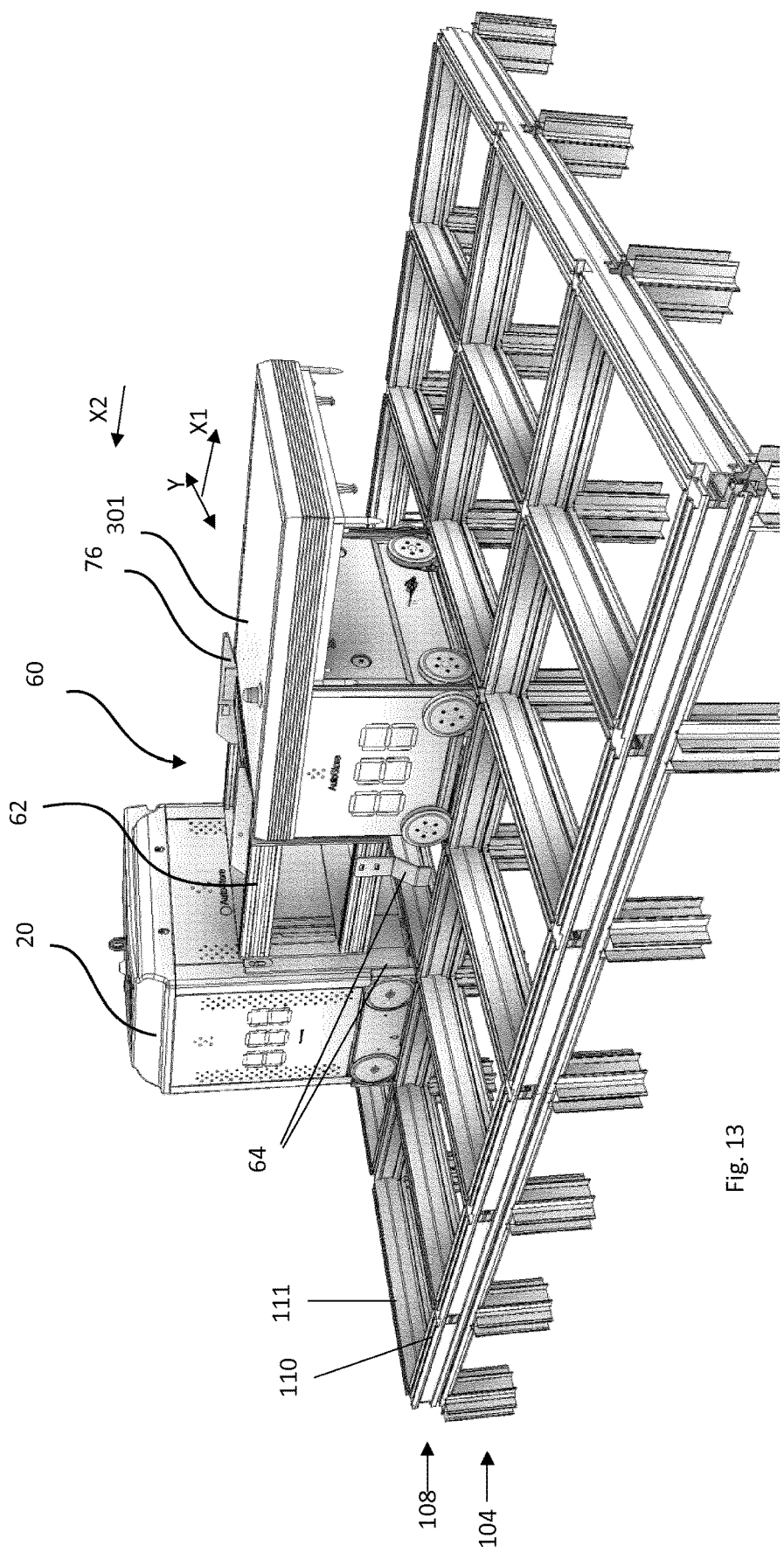
FIG. 13 illustrates the support vehicle and adapter of FIG. 12 being connected to the container handling vehicle.

It is here referred to FIGS. 11, 12 and 13. Here, the support vehicle 20 is connected to an intermediate supporting unit 60. The purpose of the intermediate supporting unit 60 is to transport a failed container handling vehicle 301 which is stuck in position P1 in FIG. 18 and is not itself capable to move to the service area due to a failure, such as an empty battery, an electrical or mechanical failure etc. To fix the vehicle 301, it must be moved to the service area.

As shown in FIG. 11, the intermediate supporting unit 60 comprises a connection interface CI fixed to a rigid framework formed by elongated bar elements 62 protruding away from the connection interface CI and cross bar elements 61 interconnecting the bar elements 62. In addition, the framework of the unit 60 comprises downwardly protruding supporting elements 64.

The connector pins 31 of the connection system 30 of the support vehicle 20 are connected to the connection interface CI and the connector pins 31 are in their upper and locked position. It can also be seen in FIG. 11 that the unit 60 is lifted by the support vehicle 20, i.e. the unit 60 is not in contact with the track system 108.

The distance between the respective downwardly protruding supporting elements 64 are adapted to the track system 108. Hence, by lowering the connector pins 31 of the support vehicle 20, the downwardly protruding supporting elements 64 will come into contact with the track system 108 and the support vehicle 20 can disconnect from the unit 60. The support vehicle 20 can re-connect to the unit 60 by moving towards the unit 60 with its connector pins 31 in their lower position and then elevate the connector pins 31 when they have been inserted into the keyhole of the connection interface again.

In FIG. 11, it is shown that the additional support unit 60 comprises a further connection system 70 for connection to a container handling vehicle 301. The connection system 70 comprises a wheel actuator 72 and a push body 74, 75 for contact with the container handling vehicle 301 when it is pushed by the support vehicle 20. In addition, the further connection system 70 comprises a pull body 76 for contact with the container handling vehicle 301 when pulled by the support vehicle 20. The pull body 76 may be hook or other type of connection interface for connection to an interface of the container handling vehicle 301.

It should be noted that the connection system 30 of the support vehicle 20 in this example may have a third position. In the first position, as described above, the connection system 30 has lowered the unit and the unit is in contact with the track system 108. Here, the support vehicle may move the connector pin 31 into or out from the keyhole KH of the connection interface CI. In the second position, the connection system 30 has lifted the unit and the unit is no longer in contact with the track system 108. However, the pull body 76 is not sufficiently elevated to be moved over the vehicle 301. Hence, to engage the additional connection system 70 with the vehicle 301, the connector pins 31 and hence the unit 60 is elevated to a third position above the second position. Now, the pull body 76 of the unit can be moved over the vehicle 301 and then the connection system 30 can be lowered to the second position again. Now, the pull body 76 is engaged with the vehicle 301.

To disconnect from the vehicle 301, the unit 60 is elevated from the third position and moved away from the vehicle 301, as the pull body 76 is not engaged with the vehicle 301 in the third position.

The wheel actuator 72 is connected to a mechanical interface 72a of the container handling vehicle 301 for adjusting wheel elevation of the container handling vehicle 301, i.e. to mechanically control if the wheels should be in contact with tracks 110 or tracks 111 of the track system. The wheel actuator 72 is driven by an electric motor controlled by the control system of the support vehicle 20 or by a control system of the entire system 1.

It should be noted that the length of the elongated bar elements 62 is adapted to the length between the rails 111. Hence, when moving along tracks 111, four tracks 11 are in contact with the wheels of the support vehicle 20 and the wheels of the vehicle 301, while when moving along tracks 110, the same two tracks are used both by the support vehicle 20 and the vehicle 301.

It should be noted that in this example, no modification of the vehicle 301 is needed.

Example 2

Figure 14:
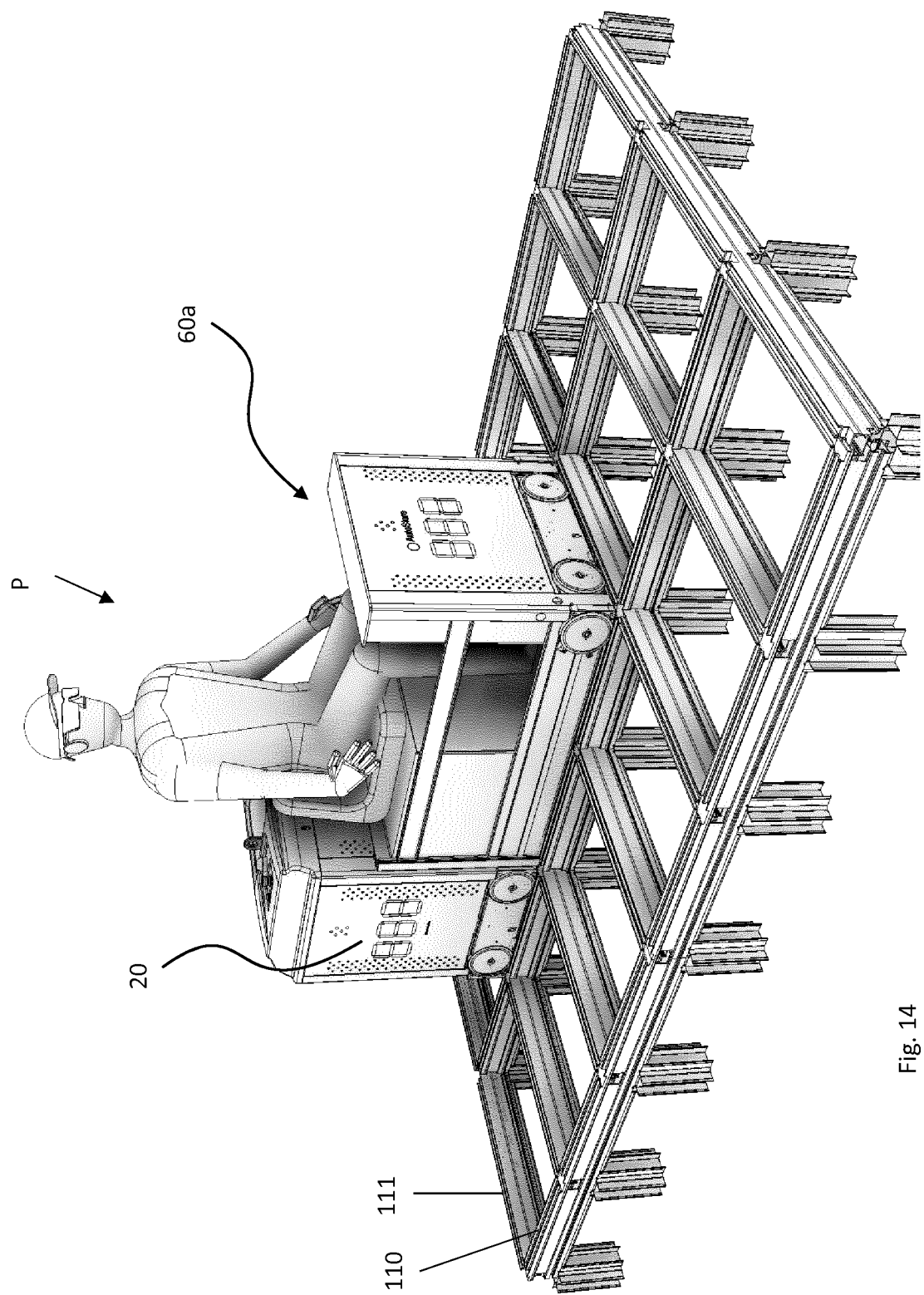
FIG. 14 illustrates a perspective view of an exemplary support vehicle connected to a person transporter unit.

It is now referred to FIG. 14. The additional support unit is here a person transporting unit 60a for transporting a person P along the track system 108, for example between the service area SA and the position P1 in FIG. 18. Also the person transporting unit 60a has a drive system with two set of wheels for moving both along tracks 110 and along tracks 111. The drive system of the unit 60a is here controlled by means of communication signals from the control system of the support vehicle 20 or the system 1. Alternatively, the drive system of the unit and the support vehicle 20 is controlled by means of a user interface of the unit 60a itself.

In addition, the unit 60a has a connection interface CI (not shown in FIG. 14) which are connected to the connection system 30 of the support vehicle 20. It should be noted that the support vehicle 20 is not intended to lift the unit 60a up from the track system 108, the purpose of the connection system 30 is only to connect to (for pulling, pushing and dragging the unit 60a) and to disconnect from the unit 60a.

Example 3

Figure 15:
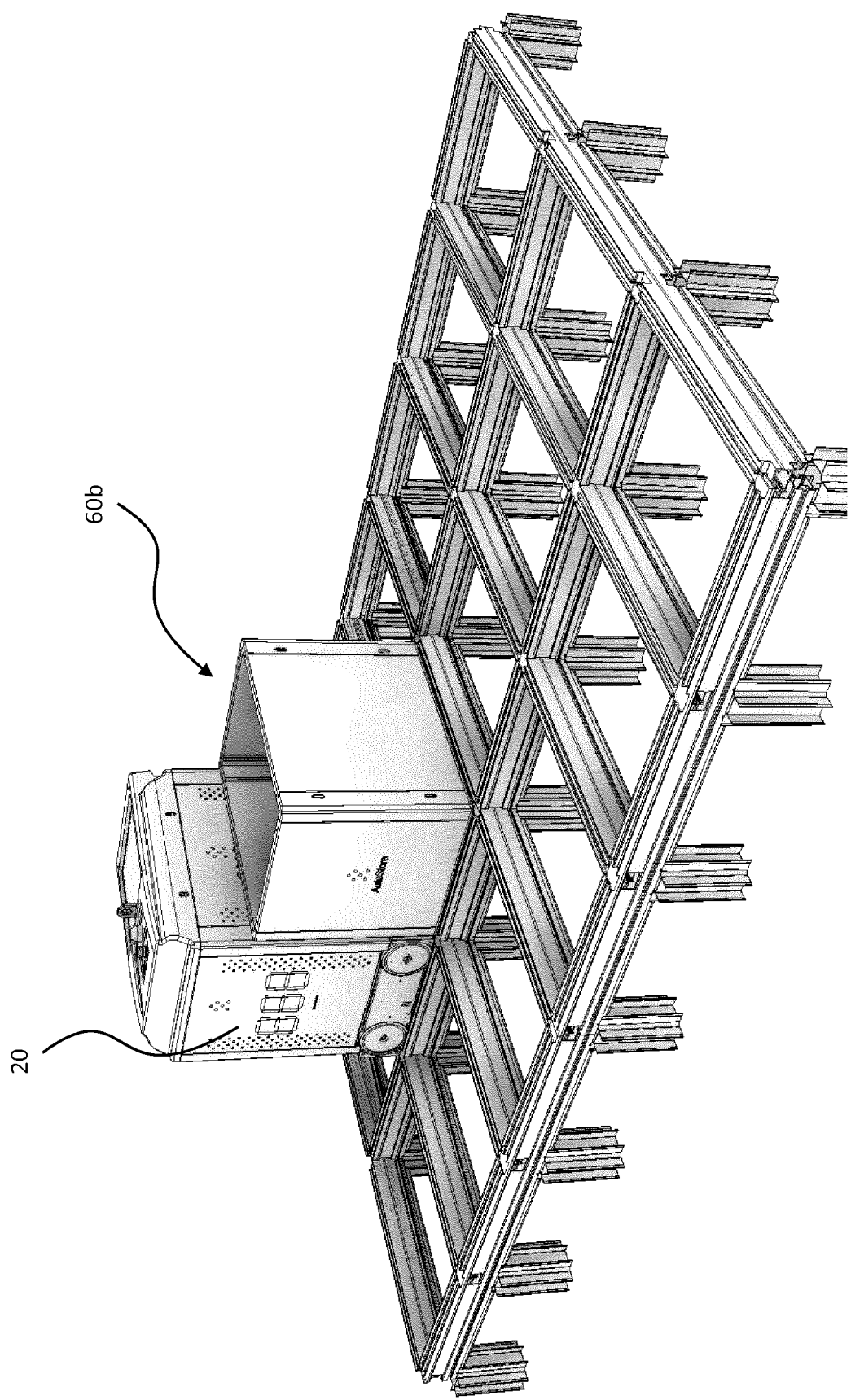
FIG. 15 illustrates a perspective view of an exemplary support vehicle connected to tool transporter unit.

It is now referred to FIG. 15. The additional support unit is here an equipment transporting unit 60b for transporting equipment along the track system 108 for example between the service area SA and the position P1 in FIG. 18. Also the unit 60b has a connection interface CI (not shown).

The unit 60b has no wheels, and the support vehicle 20 is therefore lifting the unit 60b.

Example 4

Figure 16:
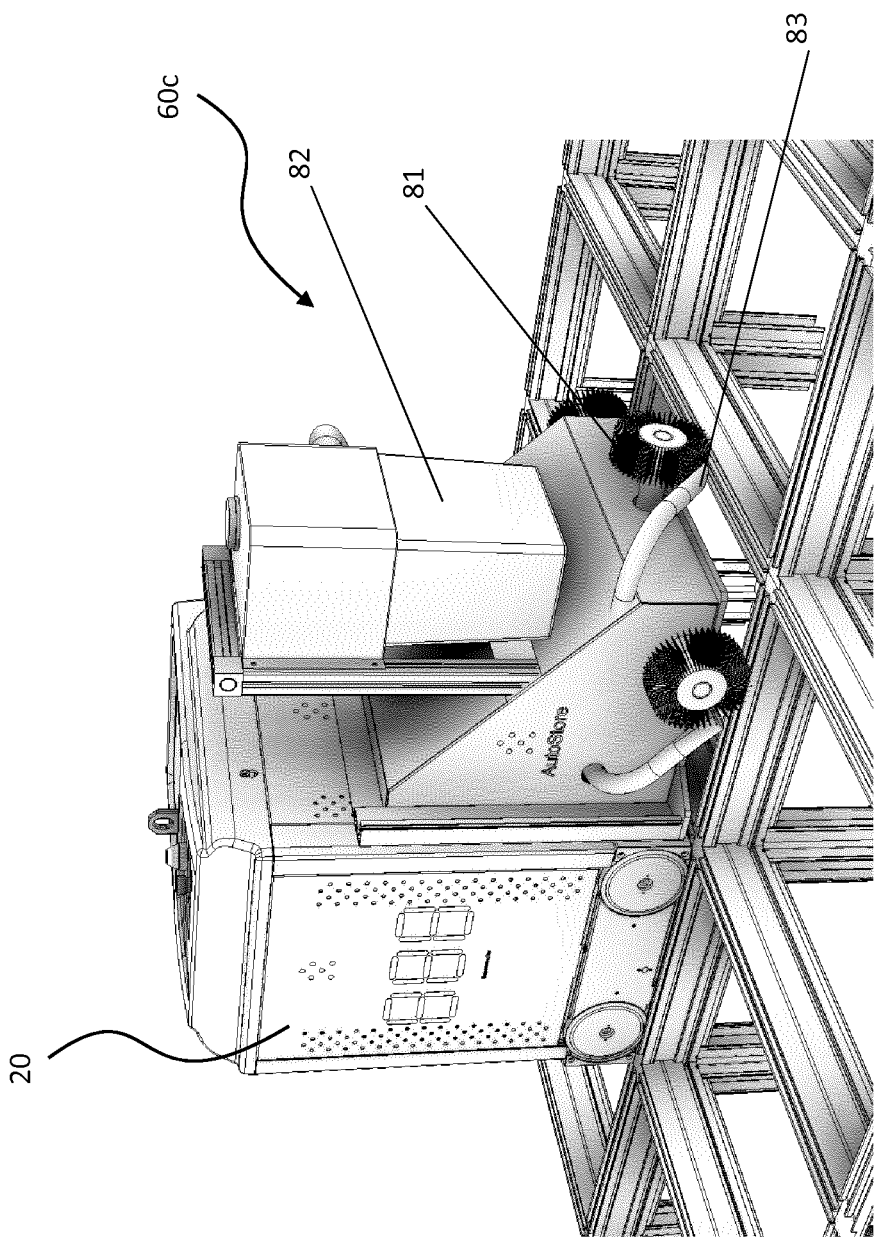
FIG. 16 illustrates a perspective view of an exemplary support vehicle connected to cleaning unit.

It is now referred to FIG. 16. The additional support unit is here a cleaning unit 60c for cleaning the track system 108. Also the unit 60c has a connection interface CI (not shown).

The cleaning unit 60c comprises rotating brushes 81 for brushing the track system 108 when moved by the support vehicle 20 along tracks 110 and tracks 111. In addition, the cleaning unit 60c comprises a vacuum cleaner 82 with a suction nozzle 83 located close to the brushes 81.

The unit 60c has no wheels, and the support vehicle 20 is therefore lifting the unit 60c.

Example 5

Figure 17B:
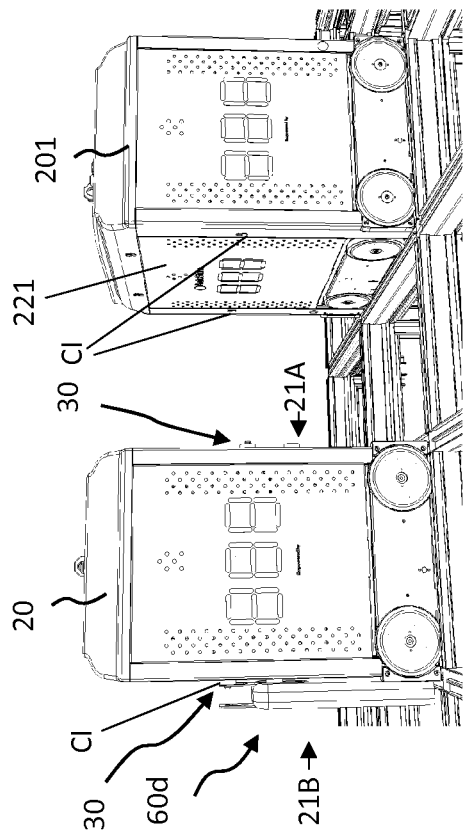
FIG. 17b illustrates another perspective view of the support vehicle of FIG. 17a and the second type of container handling vehicle.

It is now referred to FIG. 17a-d. The additional support unit is here a counterweight unit 60d for balancing the support vehicle 20. The unit 60d has a connection interface CI (not shown) which in FIGS. 17a and 17b is connected to the connection system 30 provided on the second side 21B of the vehicle body 21. The counterweight unit 60d is lifted by the support vehicle 20.

The purpose of the counterweight unit 60d is to enable the support vehicle 20 to lift and transport a failed container handling vehicle 201 of the type shown in FIGS. 17a and 17b. The container handling vehicle 201 is similar to prior art vehicles, with one modification: The container handling vehicle 201 comprises a connection interface CI. In this example, the connection interface CI is provided as two openings in the vehicle body 221, one opening for each of the connector pins 31 of the connection system 30 on the second side 21B of the vehicle body 21 of the support vehicle 20.

Figure 17C:
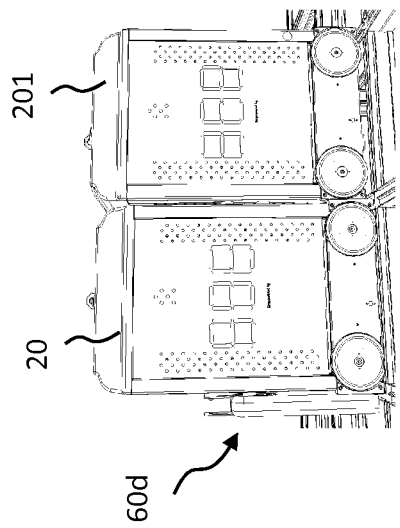
FIG. 17c illustrates the support vehicle of FIG. 17a being connected to both the weight unit and the second type of container handling vehicle.

In FIG. 17c, it is shown that the connector pins 31 of the connection system 30 moved into the openings of the connection interface CI of the vehicle 201.

Figure 17D:
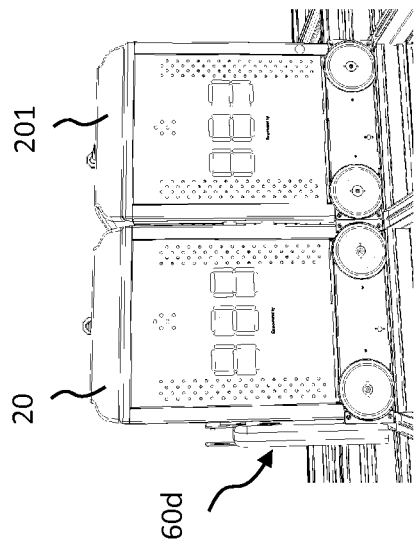
FIG. 17d illustrates how that the support vehicle of FIG. 17a is able to lift the second type of container handling vehicle up from the rails.

In FIG. 17d, it is shown that the connection system 30 is in the second (or third) position, lifting the vehicle 201 up from the grid. Due to the counterweight unit 60d, the support vehicle 20 will not tilt when lifting the vehicle 201.

Alternative Embodiments

In the above embodiments, the connector pin 31 including the pin head 31a was rotationally symmetrical around its longitudinal axis.

It is now referred to FIG. 20a-d, where some examples of alternative embodiments are shown.

In FIG. 20a, the connector pin 31 is not rotationally symmetrical, as only the upper part of the pin head 31a is protruding upwardly in a direction perpendicular to the longitudinal axis X31. Here, the keyhole KH of the connection interface is oval-shaped.

In FIG. 20b, the pin head 31a is a rectangle protruding up from the connector pin 31. Here, the keyhole KH of the connection interface is circular.

In FIG. 20c, the pin head 31a corresponds to the one shown in FIG. 20b. However, here the distal end of the head is rounded, to ease insertion into the keyhole KH. Here, the keyhole KH of the connection interface is semicircular.

In FIG. 20d, the pin head 31a is formed by providing a notch in the connector pin 31 itself, thereby separating the connector pin 31 into two separate sections, a distal section forming the pin head 31a and a proximal section 31b. Here, the keyhole KH of the connection interface is rectangular.

It should be noted that all of the above connector pins 31 may be used in combination with all of the above keyholes KH. It should be noted that the present invention is not limited to the specific examples described and shown in the drawings, many other alternatives are considered to be within the scope of the invention as defined by the claims.

It should also be noted that the operation of the actuator 34 may be dependent on, or independent of, the operation of the drive system 40. In one embodiment, the vertical distance between the slot 22 and the track system will be the same when the support vehicle is moving along tracks 110 and when the support vehicle is moving along tracks 110. In such a case, the operation of the actuator 34 can be independent from the drive system 40. However, in case the vertical distance between the slot 22 and the track system is different when the support vehicle is moving along tracks 110 and when the support vehicle is moving along tracks 111 (due to different elevation of the vehicle body 21 and the different sets of wheels), then the actuator may be operated to change the height of the connector pins based on the travel direction.

REFERENCE NUMBERS USED DESCRIPTION (1) retrieval system
(20) support vehicle
(21) vehicle body
(21) connector pin
(21A) first side
(21A) second side
(21B) second side
(22) slot
(25) central cavity
(30) connection system
(31) connector pin
(31) pin head
(31a) distal section of connector pin, pin head
(31b) proximal section of connector pin, shank
(32) first contact body
(32a) contact surface
(33) second contact body
(33a) contact surface
(34) actuator
(36) rigid member
(40) drive system
(42) (first set of) wheels
(44) (second set of) wheels
(60a) person transporting unit
(60b) equipment transporting unit
(60c) cleaning unit
(60d) counterweight unit
(61) cross bar elements
(62) rigid framework formed by elongated bar elements
(64) downwardly protruding supporting elements
(70) further connection system
(70) connection system
(72) wheel actuator
(72a) mechanical interface
(74) push body
(75) push body
(76) pull body
(81) rotating brushes
(81) brushes
(82) vacuum cleaner
(83) suction nozzle
(100) framework structure
(101) central cavity container handling vehicles
(101) container handling vehicle
(102) upright members
(103) horizontal members
(104) storage grid
(105) storage column(s)
(106) storage container
(107) stacks
(108) track or rail system
(110) first set of parallel rails
(110a) tracks
(110b) tracks
(111) second set of parallel rails
(111a) tracks
(111b) tracks
(112) grid column
(115) grid opening
(119) first port column
(120) second port column
(122) grid cell
(201) container handling vehicles
(201a) vehicle body
(201b, 201c,) wheels
(301) container handling vehicle
(301a) vehicle body
(301b, 301c) wheels
(CI) connection interface
(CS) plate-shaped connection structure
(CS) connection structure
(KH) keyhole
(KH) above keyholes
(KHa) circular opening
(KHb) narrower slot
(RS) rear side
(FS) front side
(SA) service area (P1) position
(X31) longitudinal axis

The invention claimed is:

1. Support vehicle for performing support operations in an automated storage and retrieval system, where the support vehicle comprises:
   a vehicle body;
   a drive system comprising wheels provided in a lower part of the vehicle body, the drive system being configured to drive the support vehicle along a track system of the automated storage and retrieval system;
   a connection system provided on a first side of the support vehicle; wherein
   the connection system comprises a connector member protruding through an aperture of the vehicle body,
   where the connector member is a first connector member and where the connection system further comprises a second connector member, where the first and second connector members are provided in respective apertures in the vehicle body, where the two apertures are spaced apart from each other,
   where the connector members are connected to each other via a rigid cross member located on the inside of the vehicle body;
   the connection system comprises an actuator for moving the connector member in the aperture in relation to the vehicle body.

2. Support vehicle according to claim 1, where the connection system is connectable to and disconnectable from a connection interface.

3. Support vehicle according to claim 2, where the connection interface comprises a keyhole where the connector member is connectable to and disconnectable from the keyhole.

4. Support vehicle according to claim 2, where the support vehicle comprises an additional support unit, where the connection interface is fixed to the additional support unit.

5. Support vehicle according to claim 4, where the additional support unit comprises a further connection system for connection to a container handling vehicle where the further connection system comprises:
   a wheel actuator for connection to a mechanical interface of the container handling vehicle for adjusting wheel elevation of the container handling vehicle;
   a push body for contact with the container handling vehicle when pushed by the support vehicle.

6. Support vehicle according to claim 5, where the further connection system of the additional supporting unit comprises a pull body for contact with the container handling vehicle when pulled by the support vehicle.

7. Support vehicle according to claim 4, where the additional support unit is one of the following:
   an intermediate supporting unit for connecting the support vehicle to a container handling vehicle where the support vehicle is configured to pull, push or drag the container handling vehicle along the track system to a service area of the system;
   a person transporting unit for transporting a person along the track system from the service area to a desired location in the system;
   an equipment transporting unit for transporting equipment along the track system from the service area to a desired location in the system;
   a cleaning unit for cleaning the track system; or
   a counterweight unit for balancing the support vehicle.

8. Support vehicle according to claim 1, there the aperture is an elongated slot.

9. Support vehicle according to claim 1, where the connector member comprises a head provided in the end of the member being distal from the vehicle body.

10. Support vehicle according to claim 9, where the head is provided for contact with a rear side of the connection interface.

11. Support vehicle according to claim 9, where a pin head is protruding from a pin in a direction perpendicular to a longitudinal axis of the connector member.

12. Support vehicle according to claim 9, where the connection system comprises a first contact body connected to the connector member or to the vehicle body at a horizontal distance from the head where a surface of the first contact body is provided for contact with a front surface of the connection interface.

13. Support vehicle according to claim 12, where the connection system comprises a second contact body provided at a vertical distance from the first contact body, where a surface of the second contact body is provided for contact with the front surface of the connection interface.

14. An automated storage and retrieval system comprising:
   a track system comprising a first set of parallel tracks arranged in a horizontal plane and extending in a first direction and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
   a plurality of stacks of storage containers arranged in storage columns located beneath the track system wherein each storage column is located vertically below a grid opening;
   a container handling vehicle for lifting storage containers stacked in the stacks; wherein the system comprises a support vehicle and at least one additional support unit for performing support operations in an automated storage and retrieval system, where the support vehicle comprises a connection system connectable to and disconnectable from a connection interface of the additional support unit, where the additional support unit comprises a further connection system for connection to a container handling vehicle where the further connection system comprises:
      a wheel actuator for connection to a mechanical interface of the container handling vehicle for adjusting wheel elevation of the container handling vehicle;
      a push body for contact with the container handling vehicle when pushed by the support vehicle.

15. An automated storage and retrieval system according to claim 14, where the support vehicle comprises:
   a vehicle body;
   a drive system comprising wheels provided in a lower part of the vehicle body, the drive system being configured to drive the support vehicle along a track system of the automated storage and retrieval system;
   a connection system provided on a first side of the support vehicle; wherein
   the connection system comprises a connector member protruding through an aperture of the vehicle body.

16. An automated storage and retrieval system according to claim 14, where the additional support unit is one of the following:

an intermediate supporting unit for connecting the support vehicle to a container handling vehicle, where the support vehicle is configured to pull, push or drag the container handling vehicle along the track system to a service area of the system;

a person transporting unit for transporting a person along the track system from the service area to a desired location in the system;

an equipment transporting unit~ for transporting equipment along the track system from the service area to a desired location in the system;

a cleaning unit for cleaning the track system; or a counterweight unit for balancing the support vehicle.

* * * * *